United States Patent
Yan et al.

(10) Patent No.: US 9,667,590 B2
(45) Date of Patent: May 30, 2017

(54) APN-BASED DNS QUERY RESOLUTION IN WIRELESS DATA NETWORKS

(71) Applicant: CELLCO PARTNERSHIP, Basking Ridge, NJ (US)

(72) Inventors: Lixia Yan, Bedminster, NJ (US); Ho Yin Cheuk, Bridgewater, NJ (US); Ravikumar Pattabiraman, Hillsborough, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 309 days.

(21) Appl. No.: 14/144,144

(22) Filed: Dec. 30, 2013

(65) Prior Publication Data
US 2015/0188877 A1   Jul. 2, 2015

(51) Int. Cl.
*G06F 15/16* (2006.01)
*H04L 29/12* (2006.01)
*H04L 29/08* (2006.01)

(52) U.S. Cl.
CPC ........ *H04L 61/1511* (2013.01); *H04L 61/301* (2013.01); *H04L 61/305* (2013.01); *H04L 67/1002* (2013.01); *H04L 67/1031* (2013.01); *H04L 67/1036* (2013.01); *H04L 67/28* (2013.01); *H04L 61/2007* (2013.01); *H04L 61/6095* (2013.01)

(58) Field of Classification Search
CPC .......... H04L 29/12006; H04L 61/2514; H04L 61/1511; H04L 61/2007; H04L 61/605; H04L 61/6095; H04L 61/301; H04L 67/1002; H04L 67/28; G06F 2209/463
See application file for complete search history.

(56) References Cited

U.S. PATENT DOCUMENTS

| | | | | |
|---|---|---|---|---|
| 7,694,016 | B2 * | 4/2010 | Halley | H04L 12/14 709/203 |
| 7,895,297 | B2 * | 2/2011 | Gorodyansky | G06Q 20/102 705/40 |
| 7,970,765 | B1 * | 6/2011 | Olsen | H04L 12/4679 707/737 |
| 8,613,089 | B1 * | 12/2013 | Holloway | H04L 63/1458 709/217 |
| 9,049,244 | B2 * | 6/2015 | Prince | H04L 67/2814 |
| 2005/0030917 | A1 * | 2/2005 | Haller | H04L 69/40 370/328 |

(Continued)

*Primary Examiner* — June Sison
*Assistant Examiner* — Dixon Dabipi

(57) ABSTRACT

Systems and methods for APN-based DNS query resolution for wireless data networks are disclosed. Some implementations include receiving a domain name system (DNS) query for a domain name from a device having a source IP address, the DNS query being associated with an access point name, determining whether the source IP address is within a predetermined IP address range, upon determining the source IP address is within the predetermined IP address range, updating the DNS query to include an updated domain name unique to the predetermined IP address range, forwarding the updated DNS query to a DNS server for resolution, receiving an IP address corresponding to the updated DNS query from the DNS server, the IP address being different from an IP address associated with the DNS query, and providing the device with the IP address corresponding to the updated DNS query.

21 Claims, 7 Drawing Sheets

(56) References Cited

U.S. PATENT DOCUMENTS

| | | | |
|---|---|---|---|
| 2010/0054222 A1* | 3/2010 | Rune | H04L 29/12066 370/338 |
| 2012/0155380 A1* | 6/2012 | Hodges | G06Q 30/00 370/328 |
| 2013/0051299 A1* | 2/2013 | Hua | H04W 4/06 370/312 |
| 2014/0137206 A1* | 5/2014 | Hansmann | H04W 12/08 726/4 |
| 2015/0078288 A1* | 3/2015 | Sanyal | H04W 76/022 370/329 |
| 2015/0312100 A1* | 10/2015 | Chan | H04L 63/10 709/222 |

\* cited by examiner

APN-BASED DNS QUERY RESOLUTION IN WIRELESS DATA NETWORKS

BACKGROUND

The Domain Name System (DNS) is a hierarchical distributed naming system for computers, services, or any resource connected to the Internet or a private network. DNS translates human-friendly computer hostnames to the numerical IP addresses needed for the purpose of locating computer services and devices worldwide. DNS thus provides a worldwide, distributed keyword-based redirection service, enabling functionality of the Internet.

Users are increasingly accessing domains through apps or web browsers installed on their mobile device. A web service may be delivered to users through different mechanisms such as apps and web pages. Some web services (e.g., email) can be accessed via dedicated mobile apps or by accessing website domain names dedicated to the web services.

In some cases, organizations may need to offer promotional or custom versions of apps to select customers. For example, a company offering an email service, may need to provide a promotional app that allows users of a certain data carrier or data network to access the email service without incurring a data usage cost associated with use of the service over the data network. However, regardless of whether a custom app or a web browser is used to access a web service, a DNS request for the web service resolves to the same IP address that provides the service. Thus, a user may need to navigate to a web service domain name that is different from a well-known domain name to avail of custom or promotional web services from a different IP address associated with the different domain name. This inconveniences the user and may also negatively impact the web service provider.

As the foregoing illustrates, a new approach for managing DNS requests originating from mobile devices may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
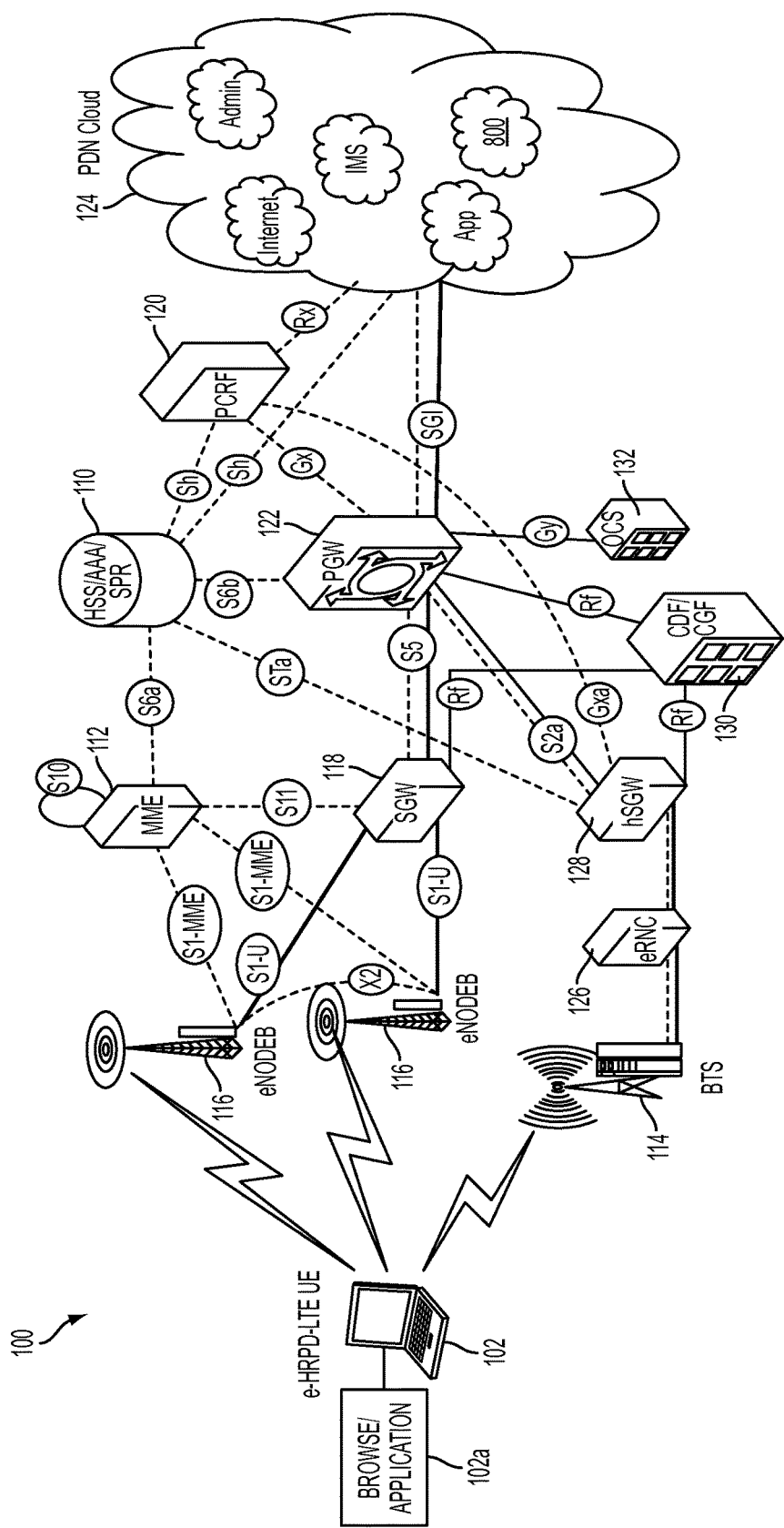
FIG. 1 illustrates a functional block diagram describing a network that can be used to implement DNS query resolution for mobile device applications.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations disclosed herein relate to methods for DNS query resolution in a wireless data network, including, but not limited to, a 4G network. The disclosed implementations are able to resolve a domain name into different IP addresses with consideration to an Access Point Name (APN) name in the wireless data network.

In some aspects, the disclosed implementations can provide special consideration (e.g., no-cost data usage) to a device originating a DNS request in a 4G network. To provide such consideration, an 800 APN (e.g., VzW800 APN) can be included in the 4G data network. The 800 APN is designed to support 800 or "free" data-usage services. Data connections that originate from device IP addresses within a pre-determined range of 800 APN IP addresses may be paid by $3^{rd}$-party service vendors, (e.g., Amazon, Google, etc.) and can be free of charge to an end user of the device. As an illustrative example, the data network can designate a device IP range of 163.167/16 to an 800 APN for free data use. It is to be appreciated that the disclosed implementations are not limited to the 800 APN and can be applied to any other APN that may exist in the 4G data network.

In some implementations, APNs that support different cost tiers of data-usage services may be included in the data network. For example, an APN can support data-usage services where a first half of data usage costs are paid by the user and the second half paid by a third-party or any other entity that may be specified by the user or the data network. Another APN, for example, can support data-usage services where a third of data usage costs are paid by the user and the remaining two thirds are paid by a third-party or any other entity that may be specified by the user or the data network. It is to be appreciated that these examples are purely illustrative and are not intended to limit the disclosed implementations.

In some implementations, the cost-tiers for an APN may be configurable based on instructions from the wireless data network, the user or even a third-party. For example, such instructions may be provided during operation of the APN to configure a cost tier associated with the APN in real-time. In another example, a cost-tier associated with an APN may be based on data usage patterns of a user. In some implementations, the APNs that are to be used may be specified by the user through a user interface provided by a wireless network provider. The user may, for example, be provided with options via the user interface to select an APN (or cost tiers associated with an APN) before incurring data usage costs. The APNs that are used to handle data usage by the wireless data network by be dependent on the user, the wireless data network, a third-party or any combination thereof.

Consider an exemplary scenario where a X1Y2 web service has been implemented with both browser based web access and mobile device application (or "X1Y2 app") access. Furthermore, the X1Y2 app has been advertised to provide data usage associated with the X1Y2 web service at no cost to the user. When a user visits X1Y2.com through a web browser, an Internet packet data network (PDN) attachment request is sent from the user's device to an Internet PDN. The device is assigned an IP address (e.g., 163.168.10.1) from an internet APN device IP range by a PDN gateway (PGW). The device may then attempt to resolve X1Y2.com to an IP address using DNS resolution. In the DNS resolution, a DNS query may be generated. The DNS query can be provided to the Internet PDN with the source IP of 163.168.10.1. The DNS query can be provided to the Internet PDN through the PGW and a load balancer. A DNS server connected to the Internet PDN receives the query and resolves X1Y2.com into the IP address x.x.x.x, where x may be any numeric value used by IP addresses. The X1Y2 website is then loaded from the x.x.x.x IP address into the web browser for display to the user. In this scenario, the user's request and subsequent traffic from X1Y2.com incurs data usage costs because the Internet PDN attachment request is triggered from a device IP address (e.g., 163.168.10.1) that is within a pre-determined Internet APN device IP range (e.g., 163.168/16) associated with paid data usage.

When the user accesses the X1Y2 web-service through the X1Y2 app, an 800 PDN attachment request is sent from the user's device to an 800 APN (e.g., VzW800 APN). As discussed above, an 800 APN can provide free or no-cost data use. The user's device is assigned with an IP (e.g., 163.167.10.1) from an 800 APN device IP range (e.g., 163.167/16) by the PGW. The device then attempts to resolve domain name X1Y2.com.

In one implementation of domain name resolution, a DNS query is generated for the resolution by the device and provided to the PGW with the source IP of 163.167.10.1. The PGW forwards the DNS query to a load balancer. Since the IP is within the 800 APN IP range (i.e., 163.167/16), the load balancer proceeds to update the domain name in the DNS query from X1Y2.com to 800.X1Y2.com. Such an update may be performed by the load balancer by updating the CNAME record of XIY2.com to point to 800.X1Y2.com. A CNAME record is an abbreviation for a Canonical Name record and is a type of resource record in DNS used to specify that a domain name uses the IP addresses of another domain, the "canonical" domain. The load balancer then forwards the DNS query with the domain name 800.X1Y2.com to a DNS server. The DNS server resolves 800.X1Y2.com into an IP address of y.y.y.y, where "y" may be any numeric value used by an IP address. A DNS response with the IP address y.y.y.y (different from IP address x.x.x.x.) is returned to the device. The device then receives and/or requests data from IP address y.y.y.y. As an example, data retrieved from IP address y.y.y.y. may indicate to the user on a user interface of the X1Y2 app that the user is availing of no-cost data usage.

In this way, the disclosed implementations are able to resolve a domain name (X1Y2.com) into different IP addresses based (either x.x.x.x or y.y.y.y) based on the APN (either an Internet APN or 800 APN). Furthermore, the user's request and subsequent traffic from X1Y2.com may not incur data usage costs for the user because an 800 PDN attachment request is triggered from an IP address (i.e., 163.167.10.1) that is within a pre-determined 800 APN device IP range (i.e., 163.167/16). As discussed above, the data usage requests originating from an address within the pre-determined 800 APN IP address range may be paid by $3^{rd}$-party service vendors, (e.g., X1Y2 web-service) and can be free of charge to the user.

In another implementation of domain name resolution, a DNS query is generated for the resolution by the device and provided to the PGW gateway with the source IP of 163.167.10.1. The PGW gateway provides the DNS query to a load balancer. Since the IP is within the 800 PDN IP range (i.e., 163.167/16), the DNS query can be forwarded to a particular virtual IP (VIP) (e.g., 2.2.2.2) of a load balancer by the PGW. When the load balancer determines that the DNS query is addressed to the particular VIP (e.g., 2.2.2.2), the load balancer proceeds to update the domain name in the query from X1Y2.com to 800.X1Y2.com. Such an update may be performed by the load balancer by updating a CNAME record of domain XIY2.com to 800.XIY2.com at the DNS server. The load balancer then forwards DNS request with domain 800.X1Y2.com to the DNS server. The DNS server resolves 800.X1Y2.com into an IP address of y.y.y.y, where "y" may be any numeric value used by an IP address. A DNS response with the IP address y.y.y.y (different from IP address x.x.x.x.) is returned to the device. The device then receives and/or requests data from IP address y.y.y.y.

In this implementation as well, the user's request and subsequent traffic with X1Y2.com does not incur data usage costs to the user because an 800 PDN attachment request is triggered from a pre-determined 800 APN device IP range. As discussed above, the data usage requests originating from an address within the pre-determined 800 APN IP address range may be paid by $3^{rd}$-party service vendors (e.g., X1Y2 web-service) and can be free of charge to the user.

In this way, the disclosed implementations are able to resolve the same domain name (X1Y2.com) into different IP addresses based (either 10.10.10.10 or 20.20.20.20) based on the APN (e.g., an Internet APN or 800 APN). Thus, a user need not navigate to a web service domain name that is different from a well-known domain name to avail himself or herself of custom or promotional web services from a different IP address associated with the different domain name. This enhances user experience. Furthermore, for example, X1Y2 customers with carrier data service (e.g., Verizon data service) can access X1Y2 web services through an app on the device without incurring data usage charges. This is because data traffic originating from the X1Y2 app is directed via an 800 APN to an 800 PDN. The 800 PDN is designed to support 800 or "free" data-usage services. The data usage that occurs on the 800 PDN may be paid by $3^{rd}$-party service vendors (e.g., X1Y2 Company) and can be free of charge to the user. Alternatively, when X1Y2 customers with carrier data service (e.g., Verizon data service) access the X1Y2 web service through a web browser, they may incur data usage costs. This is because traffic originating from the X1Y2 website is directed via an Internet APN to an Internet PDN that charges users for data usage.

Reference now is made in detail to the examples illustrated in the accompanying drawings and discussed below.

FIG. 1 illustrates a functional block diagram describing a network 100 where some aspects of DNS query resolution may be implemented. The network 100 may have all of the features, hardware, and systems of other networks, however, in this example, only the relevant portions of the network are described. The network 100 can have a Home Subscriber Server (HSS) 110. The HSS 110 evolved from a Home Location Register (HLR). In 3GPP networks, and particularly in the LTE architecture (for 3G and 4G networks), the HSS 110 can be a database of user (subscriber) information, i.e., customer profiles. The user information may include account information, account status, user preferences, features subscribed to by the user, user's current location, and allowable APNs. In roaming scenarios, the HSS 110 in the network 100 provides the user profile to a Mobility Management Entity (MME) 112.

The MME 112 is a control-node for the LTE access-network, in that it can be a single point (or "node") within the network that integrates numerous core functions and control over network flow, load sharing, etc. It can be responsible for tracking, paging, and retransmission procedures to the UE 102. The MME 112 can also be involved in the UE's activation/deactivation of service flows (also known as bearers) and is also responsible for authenticating the UE 102 when it is roaming, by interacting with the HSS 110. The UE 102 through the base station 114 or one of the eNodeBs 116 and the Serving Gateway (SGW) 118, and MME 112, registers and authenticates with the network 100. The network 100 includes LTE servers such as, for example, Policy Control and Charging Rules Function (PCRF) 120, MME 112, PDN Gateway (PGW) 122, and the SGW 118. The network 100 also includes PDN servers located in the PDN cloud 124. The PDN cloud 124 may include one or more of the followings servers: IP Multimedia System (IMS) PDN, admin PDN, Internet PDN, content filtering PDN, enterprise PDN, app PDN, and 800 PDN. The authentication procedure between the UE 102 and the MME 112 can involve multiple messages per current 3GPP standards (Authentication Request/Response, Security Mode Command/Complete, etc).

The HSS 110 communicates with the MME 112 using an S6a protocol. The communication between HSS 110 and the MME 112 may traverse zero, one, or multiple diameter proxies. In the illustrated example, the communication occurs through no diameter proxies. The diameter proxy is a border gateway for the diameter protocol. The diameter protocol is a next generation Authentication, Authorization, and Accounting (AAA) protocol for IP communication networks. The protocol facilitates the exchange of AAA related information within the network. A more complete description of the diameter protocol can be found in a Request for Comments (RFC) 3588 (as published by the Internet Society, September 2003—which can be found at http://www.ietf.org/rfc/rfc3588.txt) which is incorporated herein by reference in its entirety. The S6a protocol enables transfer of profile and authentication data for authenticating/authorizing user access between the HSS 110 and the MME 112. The MME 112 can be responsible for a number of tasks, as noted above.

The PCRF 120 is configured to specify the QoS for the bearer based on a QoS Class Identifier (QCI) and ensures such specification is in accordance with the user's subscription profile stored on the HSS 110. The subscriber profile may include information about the subscriber. The information may include, for example, the MDN associated with the UE 102 and the various services subscribed to by the subscriber. The subscriber profile on the HSS 110 may also include information about which APNs the UE 102 is allowed to access. The APNs may include an Internet APN, the vzw800 APN, the vzwapp APN, the vzwims APN, and/or the vzwadmin APN.

When the UE 102 setups data connection with each PDN, such as IMS PDN and/or Internet PDN, a data session may be created. Each data session may have one default bearer. Each bearer may be associated with one QCI. For example, when the UE 102 is connected to the Internet PDN and 800 PDN, two data sessions are setup. Each data session has one default bearer. Each default bearer is assigned with one QCI. Based on the subscriber profile, the PCRF 120 may determine the QCI that default bearer may use and then pass this information to the PGW 122 during the data session setup. The PGW 122 may then setup data session and default bearer with proper QCI. The PGW 122 is configured to assign IP addresses to the UE 102. The PGW 122 is also responsible for QoS enforcement based on the specified QoS by the PCRF 120. The PGW 122 may communicate with a load balancer, a local caching server and a DNS server to process DNS queries received from UE 102. An exemplary load balancer, local caching server and DNS server is discussed further below with respect to FIGS. 2 and 3.

The SGW 118 is configured to receive the user's IP packets. The SGW 112 is also configured to serve as a mobility anchor for the bearers when the UE 102 moves from one eNodeB 116 to another. In the illustrated example, the MME 112 also communicates with the base station/antenna 114 to receive information and requests information from the UE 102. The UE 102 may be configured to include a browser application 102a. In some implementations, the browser application 102a may include logic for identifying the specific APN (e.g., 800 APN or Internet APN) for establishing the connection to the network. Each APN connection may be associated with a different IP address as assigned by the PGW 122.

To illustrate one specific example, when a customer uses the UE 102 to access X1Y2.com, the customer enters the URL www.X1Y2.com in the address bar of the web browser 102a. The web browser 102 parses the URL and identifies that the URL scheme corresponds to the http scheme. Therefore, the web browser 102 forwards the URL to the http handler. The http-handler may call a lower layer device software API to setup data connection request to PGW 122. The MME 112 receives request and checks with HSS 110 to confirm the UE 102 is eligible to access the Internet APN. The subscriber profile on the HSS 110 or the AAA includes information about which APNs the UE 102 is allowed to access. For example, if the 800 APN does not exist in the subscriber profile, the MME 112 denies the session setup to the 800 APN. In keeping with the previous example, if the Internet APN exists in the subscriber profile, the PGW 122 grants the request for establishing the Internet APN data connection and assigns the UE 102 an IP address. The PGW 122 also connects the UE 102 to the Internet PDN and provides the UE 102 with the web page associated with X1Y2.com. The data usage associated with visiting various links while using X1Y2.com may be charged to the customer. If Internet APN does not exist in the subscriber profile, the MME 112 rejects the request and informs the UE 102 of the same.

The X1Y2 web-service may provide 800 free data service to the customer by providing a mobile device application or app. Upon selection of the app, a http-800 module module may call a lower device software API to send a data connection request to the PGW 122 with APN corresponding to the vzw800 APN. The MME 112 may check HSS 110 to determine if the UE 102 is eligible for this connection. If not, the PGW 122 rejects the request and informs the UE 102 of the same. If, however, the UE 102 is eligible for such a connection, the PGW 122 grants the request for establishing the vzw800 APN data connection and assigns the UE 102 another IP address. The PGW 122 also connects the UE 102 to the vzw800 PDN.

Each APN connection may be considered as a different pipe from the UE 102 to the PGW 122. For example, the Internet APN may be considered as a first pipe between the UE 102 and the PGW 122 and the vzw800 APN may be considered a second pipe between the UE 102 and the PGW 122. The 800 free data traffic associated with the X1Y2 app travels through the second pipe to the PGW 122 and the other traffic usage that occurs during the interaction with the X1Y2 web site may travel through the first pipe to the PGW 122. The PGW 122 distinguishes the data coming through the first pipe from the data coming through the second pipe based on, for example, the IP addresses associated with each pipe and charges the operator of the UE 102 or X1Y2 Company for the data traffic usage accordingly.

The operator of the UE 102 may be charged based on a post-pay mechanism or a pre-paid mechanism. In the post-pay mechanism, the customer is allowed to use the data network 100 first and pay for such usage later, for example, on a monthly basis. To this end, the network elements (e.g., SGW 118, hSGW 128, PGW 122) gather information about the customer's monthly data usage and forward the record to CDF 130. In keeping with the previous example, when the customer visits X1Y2.com, the network elements generate records associated with this activity (e.g., 1 MB data usage associated with visiting X1Y2.com) and forward this record to the CDF 130. The records in the CDF 130 may be updated periodically, such as every half hour. The CDF 130 formats this data usage records and sends it to the IT system of the mobile communication network provider to generate a billing statement for the customer based on this data usage record. Once the billing statement is generated, it may be associated with the customer's account.

In the pre-paid mechanism, the customer may be charged in real-time against a pre-paid deposit. For example, a pre-paid customer may have to deposit $100 on his/her account before being granted access to the data network 100. Once the customer's $100 on the account is exhausted, the customer's access to the network 100 is denied until the customer recharges its account. The pre-paid mechanism is supported by the OCS 132, which is a real-time charging system. In keeping with the previous example, when the customer launches a data session and requests access to X1Y2.com, the request is sent to the PGW 122. Before forwarding the customer's request to the X1Y2 server, the PGW 122 checks with the PCRF 120 to determine how the customer should be charged for the data traffic. If the PCRF 120 informs the PGW 122 that the customer is a post-pay customer, the PGW 122 allows access and bills the customer later. If the HSS 110 informs the PGW 122 that the customer is a pre-paid customer, the PGW 132 checks with the OCS 132 to determine if the customer has sufficient funds for this data usage. If yes, the PGW 122 forwards the customer's request to the X1Y2 server. If the OCS 132 informs the PGW 122 that the customer does not have sufficient funds, the PGW 122 stops the customer from accessing the X1Y2 server.

The PGW 122 is configured to monitor the data usage. When the customer launches a new data session, the PGW 122 sends a request to the OCS 132 to validate the customer. If the customer is valid and has money/credit or is not within TOD, the OCS 132 grants usage allowance. For example, the OCS 132 grants a specific Mega Bytes (MB) usage allowance and returns this granted usage allowance to the PGW 122. In response, the PGW 122 allows the customer to use the data network and start monitoring the data usage. Once the granted usage allowance is used up, the PGW 122 sends another request to the OCS 132 to ask for an additional usage allowance. If the customer is out-of-credit, the OCS 132 denies the additional usage allowance. The PGW 122 may maintain the data session, and stop the customer from access to the Internet by dropping the out-going data packets.

On the UE 102 side, the UE 102 may not know the customer is out-of-credit. Therefore, the applications on the UE 102 may still attempt to send data packets since data session is still up. Based on today's OS logic, when there is no incoming acknowledgement being received for the out-going data packets, after a certain time period, the OS resets radio channel (e.g., terminate existing data session and re-establish a new one). The PGW 122 knows if the granted usage allowance or data quota assigned to this user by the OCS 132 is used up. Once granted usage allowance is used up, the PGW 122 reports the used usage allowance and sends a request to the OCS 132 to ask for a new granted usage allowance or data quota. The OCS 132 charges used usage allowance reported by the PGW 122 to the customer account, and then determines if the customer has enough money/credit to grant next data quota.

For example, assume the customer has 1 GB on his/her account, the PGW 122 requests for quota from the OCS 132. The OCS 132 returns with granted usage allowance of, for example, 100 MB. The PGW 122 may then allow the customer access to the Internet. The PGW 122 monitors if the 100 MB has been depleted. If yes, the PGW 122 reports used usage allowance of 100 MB to the OCS 132 and then sends a request for a new quota. The OCS 132 updates the customer account from 1 GB to 900 MB, and then assigns a new granted usage allowance of 100 MB to the PGW 122.

Moving forward, the UE 102 may be a 3G device with a 4G network capability or a 4G device. The 4G device can communicate with the PGW 122 through the eNodeB 116 and SGW 118. The 3G device with the 4G network capability can communicate with the PGW 122 through the BTS 114, the enhanced Radio Network Controller (eRNC) 126, and the High Rate Packet Data (HRPD) serving gateway (hSGW) 128. The BTS 114 receives the radio signals from the UE 102 and passes it to the eRNC 126 which will forward the signals to the hSGW 128. The functionality of the hSGW 128 is similar to that of SGW 118 except the hSGW 128 also acts as an interface between the 3G network and the 4G network.

The UE 102 is shown to be a laptop but can take other forms. For example, the UE 102 can take the form of portable handsets, smart-phones or personal digital assistants, although they may be implemented in other form factors. Program applications, including the web browser application 102a for supporting multiple APN connections can be configured to execute on many different types of mobile devices. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

Figure 2:
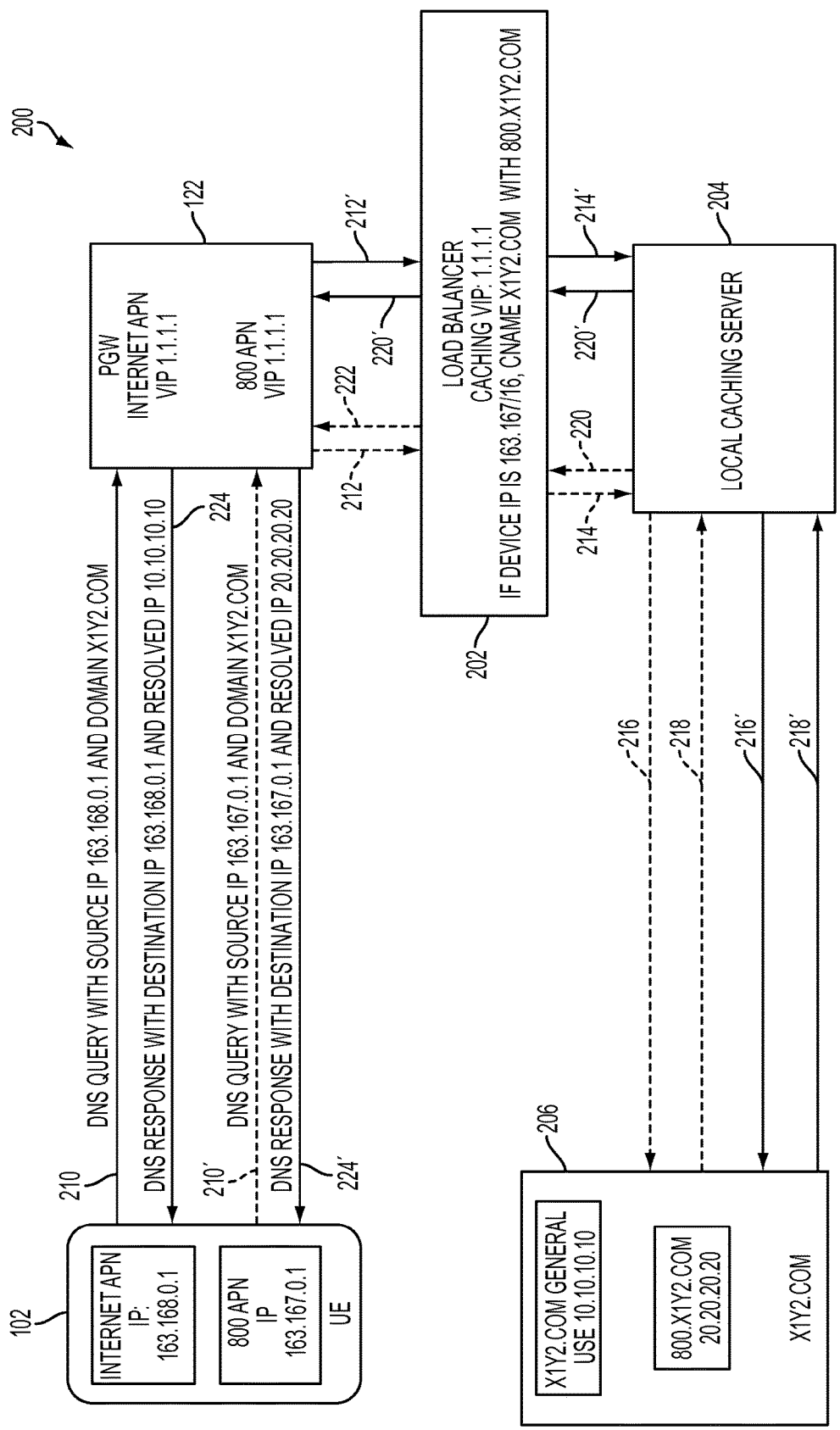
FIG. 2 illustrates an exemplary flow diagram for APN-based DNS resolution, according to one implementation.
Figure 3:
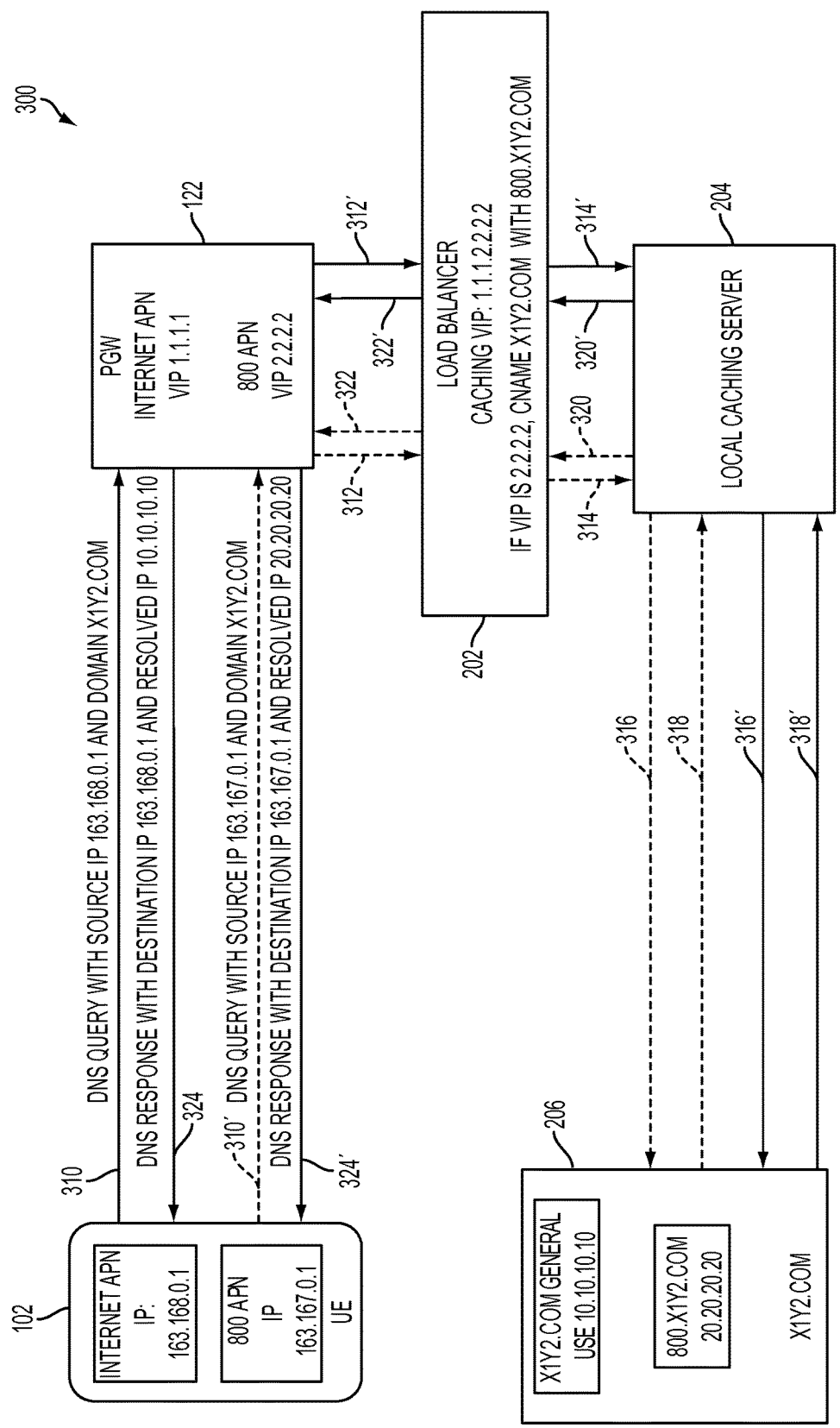
FIG. 3 illustrates an exemplary flow diagram for APN-based DNS resolution using virtual IP addresses, according to another implementation.

FIG. 2 illustrates an exemplary flow diagram 200 for APN-based DNS query resolution, according to an implementation. The flow diagram 200 involves interactions between UE 102, PGW 122, load balancer 202, local caching server 204 and authoritative DNS server 206. The IP addresses illustrated in FIG. 3 are purely illustrative and are not intended to limit the invention.

Flow diagram 200 begins with UE 102 sending a DNS query to the DNS server 206 using the Internet APN connection (step 210). The DNS query includes a source IP address of 163.168.0.1 and domain X1Y2.com. The source IP address may be selected from available IP addresses associated with the Internet APN. The DNS query may be sent through the Internet APN connection when a user navigates to X1Y2.com using a web browser instantiated on UE 102.

Alternatively in step 210', and as shown in FIG. 2, UE 102 may send the DNS query to the DNS server 206 using the 800 APN connection through the 800 PDN. In this scenario, the DNS query includes a source IP address 163.167.0.1 and domain X1Y2.com. The source IP address may be selected from available IP addresses associated with the 800 APN. The DNS query may be sent through the 800 APN when the user selects a X1Y2 app on UE 102. As discussed above, when the user accesses the X1Y2 web service through a X1Y2 app, an 800 APN connection request is made to the 800 PDN. An 800 APN can provide free or no-cost data use to the user.

In step 212 (or 212'), PGW 122 forwards query of step 210 or 210', respectively, to VIP 1.1.1.1, which is an IP address of load balancer 202, regardless of the APN connection through which the query is received.

In step 214 (or 214'), load balancer 202 checks the source IP address of the DNS query before load balancer 202 routes the DNS query to local caching server 204. When the source IP 163.167.0.1 is within the 163.167.0.0/16 range of the 800 APN, load balancer 202 proceeds to update the domain name X1Y2.com to 800.X1Y2.com in the DNS query (step 214). When the source IP 163.167.0.1 is not within 163.167.0.0/16 range (e.g., 163.168.0.1) (step 214'), load balancer 202 does not change the domain name in the DNS query.

In step 216 (or 216'), local caching server 204 may check its own database of DNS entries to resolve the DNS query. As an example, local caching server 204 may check one or more DNS A entries in the database. A DNS A entry is used to point a logical domain name, such as "X1Y2.com," to the IP address of X1Y2's hosting server, e.g., "10.10.10.10". If a matching DNS A entry with 800.X1Y2.com is found in the database of local caching server 204, then the local caching server 204 provides a response, including a resolved IP address, to the load balancer 202. Otherwise, local caching server 204 provides the DNS query for 800.X1Y2.com to the DNS server 206 in step 216 or X1Y2.com in step 216'.

In step 218, the DNS server 206 resolves the domain name X1Y2.com to 10.10.10.10. This may happen in a scenario when the UE 102 (with source IP 163.168.0.1) has provided the DNS query on the Internet PDN connection. Alternatively, in step 218', the DNS server 206 may resolve the domain name 800.X1Y2.com to 20.20.20.20. This may happen in a scenario when the UE 102 (with source IP 163.167.0.1) has provided the DNS query on the 800 PDN. Resolved IP addresses (either 10.10.10.10 or 20.20.20.20) are then returned to local caching server 204.

In step 220 (or 220'), local caching server 204 stores an A entries corresponding to the resolved IP addresses received from the DNS server 206 into the database of local caching server 204. Local caching server 204 then forwards a DNS response including a resolved IP address (either 10.10.10.10 in step 220 or 20.20.20.20 in step 220') to load balancer 202. The stored A entries may be used to service future DNS requests originating from load balancer 202.

In step 222 (or 222'), load balancer 202 forwards the DNS response including the resolved IP address received in steps 220 or 220', respectively, from local caching server 204 to PGW 122. The resolved IP addresses are further forwarded by PGW 122 to UE 102 in step 224 for resolved IP address 10.10.10.10 and step 224' for resolved IP address 20.20.20.20. UE 102 then sends request for content to the resolved IP address and receives content from the resolved IP address.

In this way, the disclosed implementations are able to resolve the same domain name (X1Y2.com) into different IP addresses based (either 10.10.10.10 or 20.20.20.20) based on the APN (e.g., an Internet APN or 800 APN). Thus, a user need not navigate to a web service domain name that is different from a well-known domain name to avail of custom or promotional web services from a different IP address associated with the different domain name. This enhances user experience. Furthermore, for example, X1Y2 customers with carrier data service (e.g., Verizon data service) can access X1Y2 web services through an app on the device without incurring data usage charges. This is because data traffic originating from the X1Y2 app is directed via an 800 APN to an 800 PDN. The 800 PDN is designed to support 800 or "free" data-usage services. The data usage that occurs on the 800 PDN may be paid by $3^{rd}$-party service vendors (e.g., X1Y2 Company) and can be free of charge to the user. Alternatively, when X1Y2 customers with carrier data service (e.g., Verizon data service) access the X1Y2 web service through a web browser, they may incur data usage costs. This is because traffic originating from the X1Y2 website is directed via an Internet APN to an Internet PDN that charges users for data usage.

FIG. 3 illustrates an example flow diagram 300 for APN-based DNS resolution using virtual IP addresses, according to an implementation. The flow diagram 400 involves interactions between UE 102, PGW 122, load balancer 202, local caching server 204 and authoritative DNS server 206. The IP addresses illustrated in FIG. 3 are purely illustrative and are not intended to limit the invention.

The flow diagram begins with UE 102 sending a DNS query to the DNS server 206 using the Internet APN connection (step 310). The DNS query includes a source IP address of 163.168.0.1 and domain X1Y2.com. The source IP address may be selected from among available IP addresses associated with the Internet APN. The DNS query may be sent through the Internet APN connection when a user navigates to X1Y2.com using a web browser instantiated on UE 102. Alternatively in step 310', and as shown in FIG. 3, UE 102 may send the DNS query to the DNS server 206 using the 800 APN connection through the 800 PDN. In this scenario, the DNS query includes a source IP 163.167.0.1 and domain X1Y2.com. The source IP address may be selected among available IP addresses associated with the 800 APN. The DNS query may be sent through the 800 APN when the user selects a X1Y2 app on UE 102. As discussed above, when the user accesses the X1Y2 web service through a X1Y2 app, an 800 APN connection request is made to the 800 PDN. An 800 APN can provide free or no-cost data use to the user.

In step 312, if the source IP (e.g., 163.168.0.1) is within the 163.168.0.1/16 range of the Internet APN, PGW 112 may forward the query to VIP 1.1.1.1, which is an IP address of load balancer 202. Alternatively, in step 312', when the source IP (e.g., 163.167.0.1) is within the 163.167.0.0/16 range of the 800 APN, PGW 112 may forward the query to VIP 2.2.2.2. VIP 1.1.1.1 and 2.2.2.2 are both VIPs associated with load balancer 202. However, each DNS VIP may be configured to receive DNS queries from distinct pre-determined IP address ranges associated with APNs.

In step 314, load balancer 202 proceeds to update the domain name from X1Y2.com to 800.X1Y2.com in the DNS query if the DNS query is received at VIP 2.2.2.2. However, if the DNS query is received at VIP 1.1.1.1 in step 314', load balancer 202 does not modify the domain name of X1Y2.com. After changing the domain name to 800.X1Y2.com, load balancer 202 may forward the DNS query to local caching server 204.

In step 316 (or 316'), local caching server 204 may check its own database of DNS entries to resolve the DNS query. As an example, local caching server 204 may check one or more DNS A entries in the database. A DNS A entry is used to point a logical domain name, such as "X1Y2.com," to the IP address of X1Y2's hosting server, e.g., "10.10.10.10". If a matching DNS A entry with 800.X1Y2.com or X1Y2.com is found in the database of local caching server 204, then the local caching server 204 provides a response, including a resolved IP address, to load balancer 202. Otherwise, the local caching server 204 provides the DNS query for 800.X1Y2.com in step 316 or X1Y2.com in step 316' to authoritative DNS server 206.

In step 318, when UE 102 has provided the DNS query via VIP 1.1.1.1, authoritative DNS server 206 may resolve the domain name X1Y2.com to IP address 10.10.10.10. Alternatively, in step 318', when UE 102 has provided the DNS query VIP 2.2.2.2, authoritative DNS server 206 may resolve 800.X1Y2.com to IP address, 20.20.20.20. Resolved IP addresses (either 10.10.10.10 or 20.20.20.20) are the returned to local caching server 204.

In step 320 (or 320'), local caching server 204 stores a A entries corresponding to the resolved IP addresses received from step 415 into the database of local caching server 204. Local caching server 204 then forwards a DNS response including a resolved IP address (either 10.10.10.10 in step 320 or 20.20.20.20 in step 320') to load balancer 202. The stored A entries may be used to service future DNS requests originating from load balancer 202.

In step 322 (or 322'), load balancer 202 forwards the DNS response including the resolved IP address (either 10.10.10.10 in step 320 or 20.20.20.20 in step 320') received from local caching server 204 to PGW 122. The resolved IP address is further forwarded by PGW 122 to UE 102 in step 324 for resolved IP address 10.10.10.10 and 324' for resolved IP address 20.20.20.20. UE 102 then sends request for content to the resolved IP address and proceeds to receive content from the resolved IP address.

In this way, the disclosed implementations are able to resolve the same domain name (X1Y2.com) into different IP addresses based (either x.x.x.x or y.y.y.y) based on the APN (e.g., an Internet APN or 800 APN). Thus, a user need not navigate to a web service domain name that is different from a well-known domain name to avail of custom or promotional web services from a different IP address associated with the different domain name. This enhances user experience. Furthermore, for example, X1Y2 customers with carrier data service (e.g., Verizon data service) can access X1Y2 web services through an app on the device without incurring data usage charges. This is because data traffic originating from the X1Y2 app is directed via an 800 APN to an 800 PDN. The 800 PDN is designed to support 800 or "free" data-usage services. The data usage that occurs on the 800 PDN may be paid by $3^{rd}$-party service vendors (e.g., X1Y2 Company) and can be free of charge to the user. Alternatively, when X1Y2 customers with carrier data service (e.g., Verizon data service) access the X1Y2 web service through a web browser, they may incur data usage costs. This is because traffic originating from the X1Y2 website is directed via an Internet APN to an Internet PDN that charges users for data usage.

Figure 4:
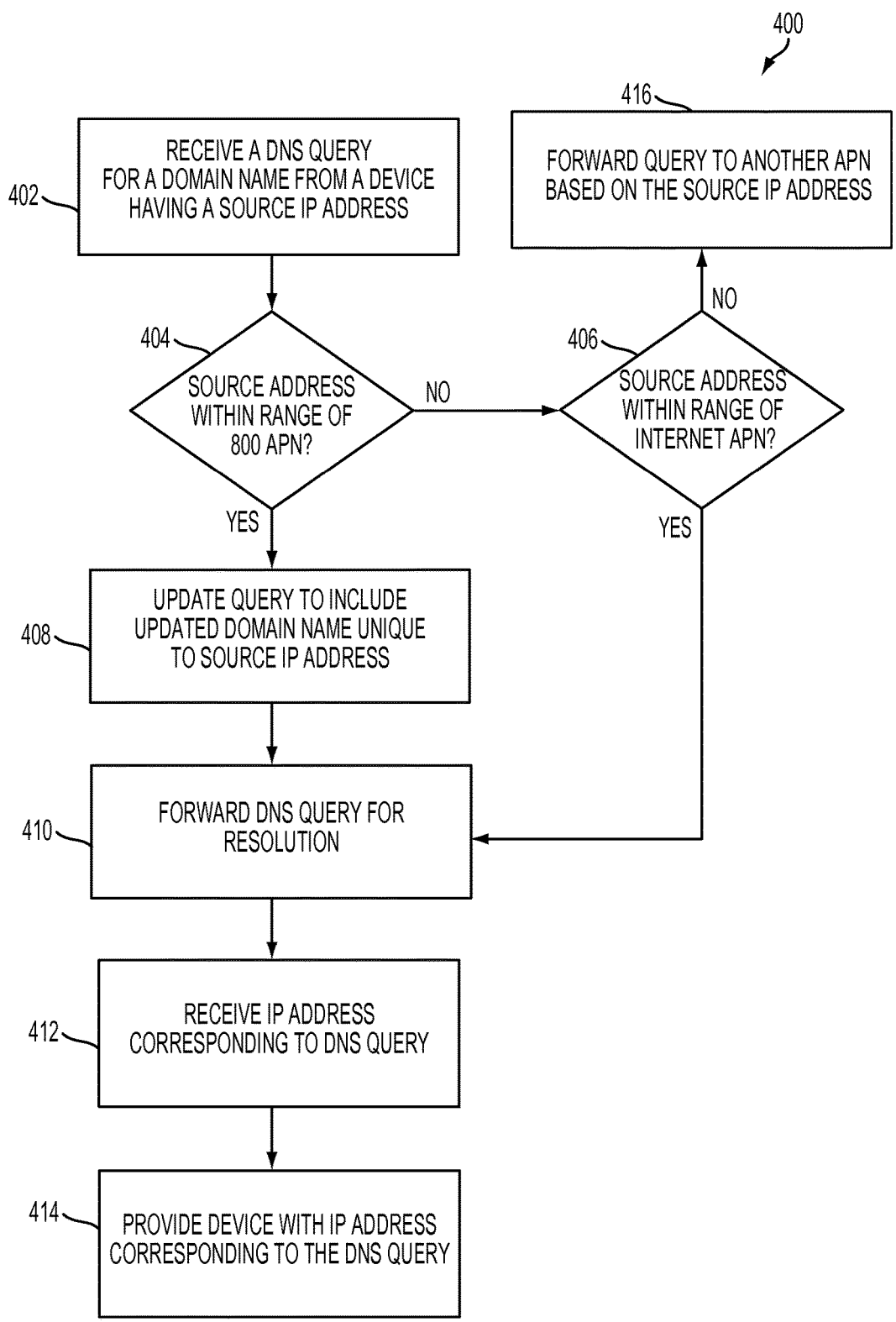
FIG. 4 illustrates an exemplary method according to an implementation of APN-based DNS query resolution.

FIG. 4 illustrates method 400 according to an implementation of APN-based DNS query resolution. Method 400 begins with receiving a domain name system (DNS) query for a domain name from a device having a source IP address, the DNS query being associated with an access point name (step 402).

Method 400 proceeds by checking if whether the source IP address is within a predetermined IP address range of an 800 APN (step 404).

If it is determined that the source IP address is not within a predetermined IP address range of an 800 APN (step 404, No), method 400 checks whether the source IP address is within a predetermined IP address range of an Internet APN (step 406). If the source IP address is not within a predetermined IP address range of an Internet APN (step 406, No), method 400 proceeds to forward the query to another APN based on the source IP address (step 416). If the source IP address is within predetermined IP address range of an Internet APN (step 406, Yes), method 400 proceeds to step 410.

Returning to step 404, if it is determined that the source IP address is within the predetermined IP address range (step 404, Yes), the DNS query is updated to include an updated domain name unique to the predetermined IP address range (step 408). As an example, load balancer 202 checks the source IP address of DNS query before load balancer 202 routes the DNS query to local caching server 204. When the source IP 163.167.0.1 is within 163.167.0.0/16 range of an 800 APN, load balancer 202 proceeds to update the CNAME record of X1Y2.com to 800.X1Y2.com. When the source IP 163.167.0.1 is not within 163.167.0.0/16 range (e.g., 163.168.0.1), load balancer 202 does not modify a CNAME record of X1Y2.com to 800.X1Y2.com.

Method 400 proceeds by forwarding the updated DNS query from step 408 (or non-updated DNS query from step 406) to a DNS server for resolution (step 410).

In response to forwarding the DNS query to a DNS server for resolution (step 410), an IP address corresponding to the updated DNS query from step 408 (or non-updated DNS query from step 406) is received from the DNS server (step 412). As an example, when UE 102 (with source IP address 163.168.0.1) has provided the DNS query to an Internet PDN, authoritative DNS server 206 may resolve the domain name X1Y2.com to IP address 10.10.10.10. Alternatively, when UE 102 (with source IP 163.167.0.1) has provided the DNS query to an 800 PDN, authoritative DNS server 206 may resolve 800.X1Y2.com to IP address 20.20.20.20. Method 400 ends with providing the device with the IP address corresponding to the updated DNS query (step 414).

In this way, the disclosed implementations are able to resolve the same domain name (X1Y2.com) into different IP addresses based (either 10.10.10.10 or 20.20.20.20) based on the APN (e.g., an Internet APN or 800 APN). Thus, a user need not navigate to a web service domain name that is different from a well-known domain name to avail of custom or promotional web services from a different IP address associated with the different domain name. This enhances user experience.

Figure 5:
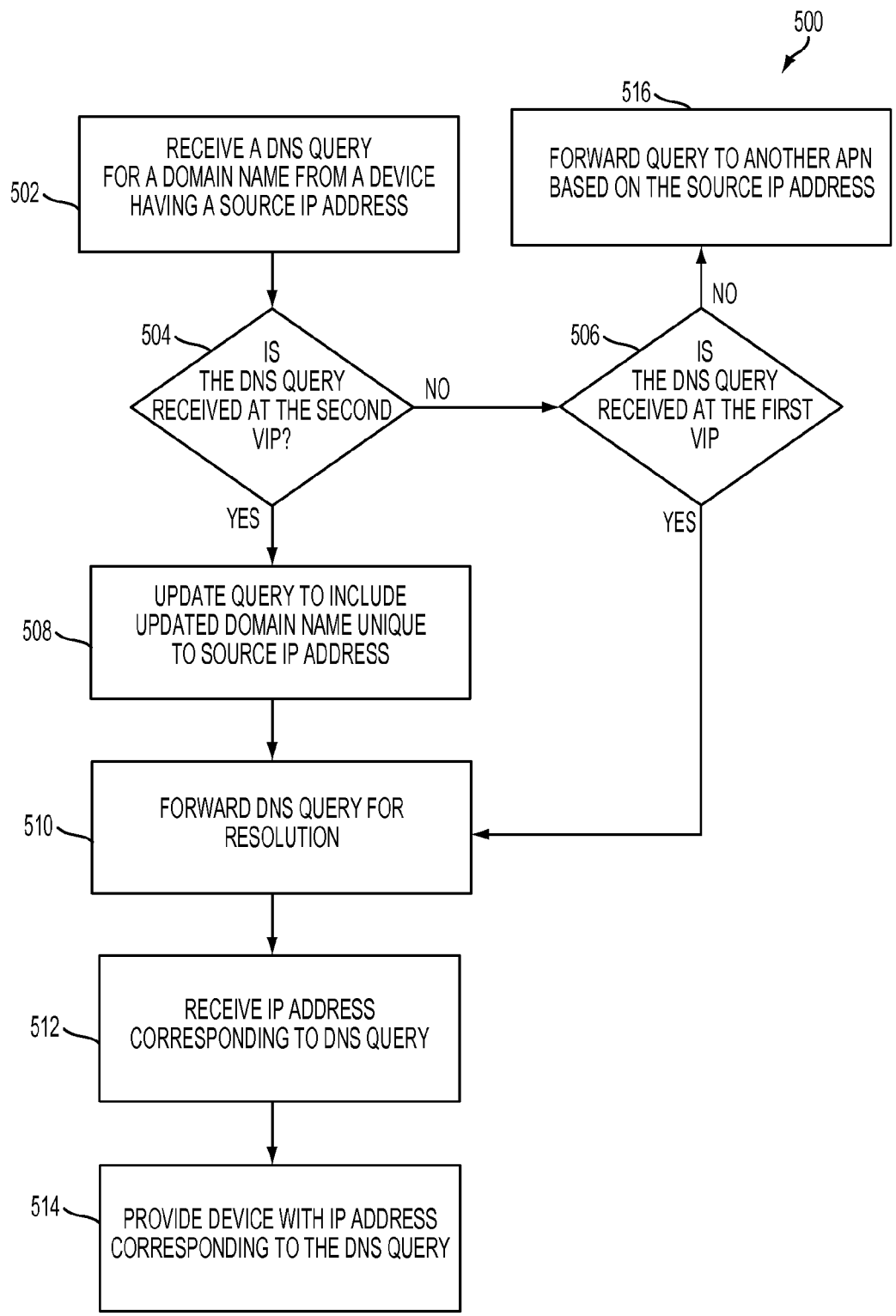
FIG. 5 illustrates an exemplary method according to an implementation of APN-based DNS query resolution using virtual IP addresses.

FIG. 5 illustrates method 500 for APN-based DNS resolution, according to an implementation. Method 500 begins with receiving a domain name system (DNS) query for a domain name from a device having a source IP address, the DNS query being associated with an access point name (step 502).

Method 500 proceeds by checking whether the DNS query is received on a first IP address of a load balancer or a second IP address of the load balancer (step 504). The first IP address can be a virtual IP address associated with an Internet APN IP address range (e.g., 163.168/16). The second IP address can be a virtual IP address being associated with an 800 APN IP address range (e.g., 163.167/16). As an example, if the source IP (e.g., 163.168.0.1) is within the 163.168.0.0/16 range of the Internet APN, the query may be received from PGW 112 at DNS VIP 1.1.1.1. When the source IP (e.g., 163.167.0.1) is within the 163.167.0.0/16 range of the 800 APN, the query may be received from PGW 112 at DNS VIP 2.2.2.2.

If it is determined that the DNS query is not received at the second IP address (e.g., 2.2.2.2) of the load balancer (step 504, No), method 400 checks whether the DNS query is received at the first IP address (e.g., 1.1.1.1) of the load balancer (step 506). If the source IP address is not received at the first IP address of the load balancer (step 506, No), method 500 proceeds to forward the query to another APN based on the source IP address (step 516). If the source IP address is received at the first IP address of the load balancer (step 506, Yes), method 400 proceeds to step 510.

Returning to step 504, if it is determined that the DNS query is received at the second IP address of the load balancer (step 504, Yes), the DNS query is updated to include an updated domain name unique to the predetermined IP address range (step 508). As an example, load balancer 202 modifies the CNAME record of X1Y2.com to 800.X1Y2.com if the DNS query is received at VIP 2.2.2.2. However, if the DNS query is received at VIP 2.2.2.2, load balancer 202 does not modify the CNAME record of X1Y2.com.

Method 500 proceeds by forwarding the updated DNS query from step 408 (or non-updated DNS query from step 406) to a DNS server for resolution (step 510).

In response to forwarding the DNS query to a DNS server for resolution (step 510), an IP address corresponding to the updated DNS query from step 408 (or non-updated DNS query from step 506) can be received from the DNS server (step 512). As an example, when UE 102 has provided the DNS query to an Internet PDN via VIP 1.1.1.1, authoritative DNS server 206 may resolve the domain name X1Y2.com to example IP address 10.10.10.10. Alternatively, when UE 102 has provided the DNS query to an 800 PDN via VIP 2.2.2.2, authoritative DNS server 206 may resolve 800.X1Y2.com to IP address, 20.20.20.20. Method 500 ends with providing the device with the IP address corresponding to the updated DNS query (step 514).

In this way, the disclosed implementations are able to resolve the same domain name (X1Y2.com) into different IP addresses based (either 10.10.10.10 or 20.20.20.20) based on the APN (e.g., an Internet APN or 800 APN). Thus, a user need not navigate to a web service domain name that is different from a well-known domain name to avail of custom or promotional web services from a different IP address associated with the different domain name. This enhances user experience.

As shown by the above discussion, functions relating to APN-based DNS query resolution may be implemented on computers connected for data communication via the components of a packet data network, operating as PGW 122 and/or as a load balancer 202 as shown in FIG. 1. Although special purpose devices may be used, such devices also may be implemented using one or more hardware platforms intended to represent a general class of data processing device commonly used to run "server" programming so as to implement the APN-based DNS query resolution functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for allowing multiple APN connections support on the web browser. The software code is executable by the general-purpose computer that functions as the PGW 122 and/or as load balancer 202. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for APN-based DNS resolution, in essentially the manner performed in the implementations discussed and illustrated herein.

Figure 6:
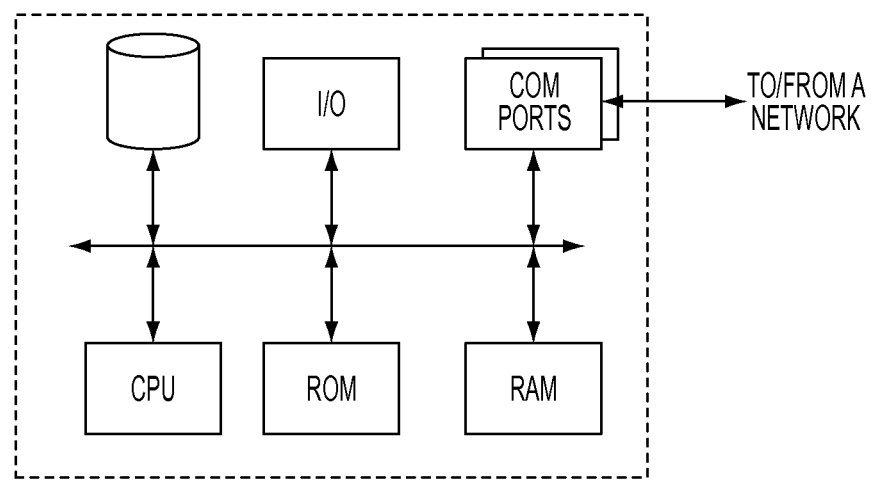
FIG. 6 illustrates a simplified functional block diagram of a computer that may be configured to function as any of the devices of FIG. 1.
Figure 7:
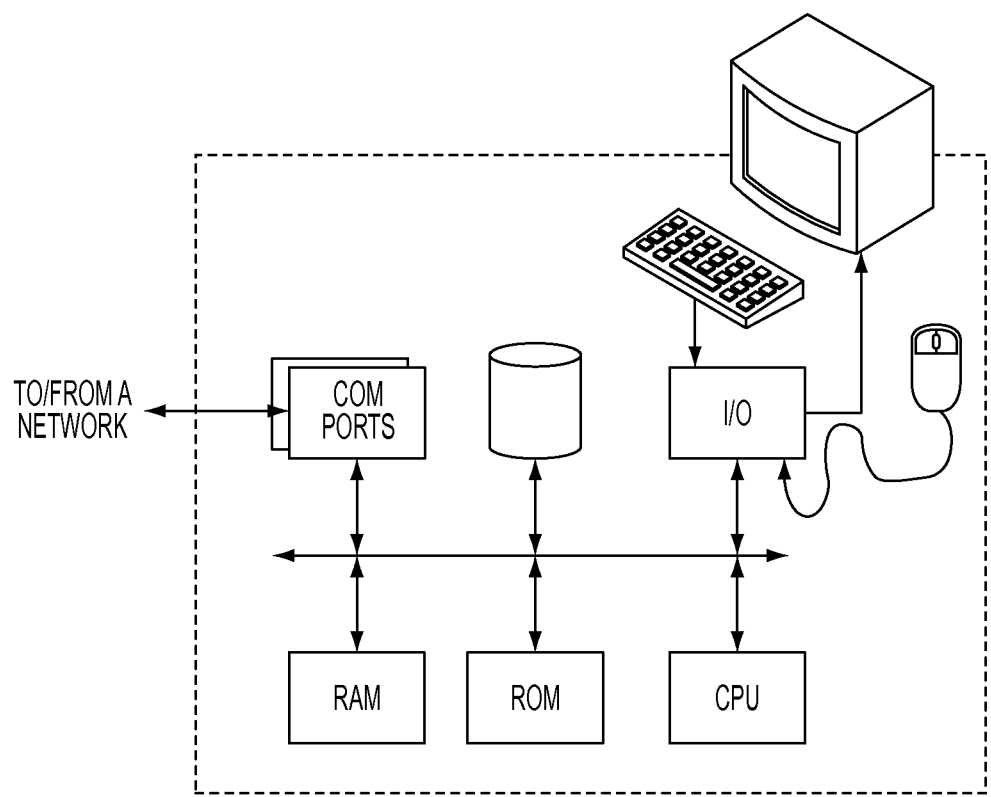
FIG. 7 illustrates a simplified functional block diagram of a personal computer or other work station or terminal device that may be configured to function as any of the devices of FIG. 1.

FIGS. 7 and 8 provide functional block diagram illustrations of general purpose computer hardware platforms. FIG. 7 illustrates a network or host computer platform, as may typically be used to implement a server. FIG. 8 illustrates a computer with user interface elements, as may be used to implement a personal computer or other type of work station or terminal device, although the computer of FIG. 8 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing multiple APN connections support outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the communication network provider into the computer platform of PGW 122 and/or load balancer 202. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement APN-based DNS resolution shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving a domain name system (DNS) query for a domain name from a device having a source IP address, the DNS query being associated with an access point name;
    determining whether the source IP address is within a predetermined IP address range associated with the access point name;
    upon determining the source IP address is within the predetermined IP address range, updating the DNS query by modifying the domain name to an updated domain name based on the predetermined IP address range and by including the updated domain name in the DNS query, the updated domain name being unique to the predetermined IP address range;

forwarding the updated DNS query to a DNS server for resolution;

receiving an IP address corresponding to the updated domain name included in the updated DNS query from the DNS server, the IP address being different from an IP address associated with the domain name included in the DNS query prior to being updated; and providing the device with the IP address corresponding to the updated domain name.

2. The method of claim 1, wherein the access point name includes an access point name different from an Internet access point name.

3. The method of claim 1, wherein the access point name includes an 800 access point name.

4. The method of claim 3, wherein data requests associated with the 800 access point name are charged for data usage costs to a third-party distinct from a user of the device.

5. The method of claim 1, wherein the updating includes:
updating a DNS CNAME record associated with the domain name to generate the updated domain name.

6. The method of claim 1, wherein the domain name system (DNS) query is received from an application instantiated on the device.

7. The method of claim 1, further comprising:
receiving the IP address corresponding to the updated DNS query from a local caching server, when a matching DNS A entry with the updated domain name exists in the database of the local caching server.

8. A server, comprising:
a processor;
a storage device accessible to the processor; and
an executable program stored in the storage device, wherein execution of the program by the processor configures the server to perform functions, including functions to:
receive a domain name system (DNS) query for a domain name from a device having a source IP address, the DNS query being associated with an access point name;
determine whether the DNS query is received on a first IP address of a load balancer or a second IP address of the load balancer, the second IP address being a virtual IP address being associated with the access point name;
update the DNS query by modifying the domain name to an updated domain name based on the predetermined IP address range and by including the updated domain name in the DNS query upon determining that the DNS query is received on the second IP address,
forward the updated DNS query to a DNS server for resolution;
receive an IP address corresponding to the updated domain name included in the updated DNS query from the DNS server, the IP address being different from an IP address associated with the domain name included in the DNS query prior to being updated; and
provide the device with the IP address corresponding to the updated domain name.

9. The server of claim 8, wherein the access point name includes an access point name different from an Internet access point name.

10. The server of claim 8, wherein the access point name includes an 800 access point name.

11. The server of claim 10, wherein data requests associated with the 800 access point name are charged for data usage costs to a third-party distinct from a user of the device.

12. The server of claim 8, wherein execution of the program by the processor configures the server to perform functions, including functions to:
update a DNS CNAME record associated with the domain name to generate the updated domain name.

13. The server of claim 8, wherein the domain name system (DNS) query is received from an application instantiated on the device.

14. The server of claim 8, wherein execution of the program by the processor configures the server to perform functions, including functions to:
receive the IP address corresponding to the updated DNS query from a local caching server, when a matching DNS A entry with the updated domain name exists in the database of the local caching server.

15. A non-transitory computer-readable medium comprising instructions which, when executed by one or more computers, cause the one or more computers to:
receive a domain name system (DNS) query for a domain name from a device having a source IP address, the DNS query being associated with an access point name;
determine whether the DNS query is received on a first IP address of a load balancer or a second IP address of the load balancer, the second IP address being a virtual IP address being associated with the access point name;
update the DNS query by modifying the domain name to an updated domain name based on the predetermined IP address range and by including the updated domain name in the DNS query upon determining that the DNS query is received on the second IP address,
forward the updated DNS query to a DNS server for resolution;
receive an IP address corresponding to the updated domain name included in the updated DNS query from the DNS server, the IP address being different from an IP address associated with the domain name included in the DNS query prior to being updated; and
provide the device with the IP address corresponding to the updated domain name.

16. The computer readable medium of claim 15, wherein the access point name includes an access point name different from an Internet access point name.

17. The computer readable medium of claim 15, wherein the access point name includes an 800 access point name.

18. The computer readable medium of claim 17, wherein data requests associated with the 800 access point name are charged for data usage costs to a third-party distinct from a user of the device.

19. The computer readable medium of claim 15, further comprising instructions that cause the one or more computers to:
update a DNS CNAME record associated with the domain name to generate the updated domain name.

20. The computer readable medium of claim 15, wherein the domain name system (DNS) query is received from an application instantiated on the device.

21. The method of claim 1, wherein the source IP address is an Internet IP address.

* * * * *